US005449715A

United States Patent [19]

Plochocka et al.

[11] Patent Number: 5,449,715

[45] Date of Patent: Sep. 12, 1995

[54] COLORLESS, NON-TOXIC, STABILIZED AQUEOUS SOLUTION OF A C1-C5 ALKYL VINYL ETHER AND MALEIC ACID COPOLYMERS

[75] Inventors: Krystyna Plochocka, Scotch Plains; Jui-Chang Chuang, Wayne, both of N.J.

[73] Assignee: ISP Investments Inc., Wilmington, Del.

[21] Appl. No.: 91,809

[22] Filed: Jul. 15, 1993

Related U.S. Application Data

[63] Continuation-in-part of Ser. No. 761,089, Sep. 17, 1991, abandoned.

[51] Int. Cl.[6] .............................................. C08L 31/06

[52] U.S. Cl. .................................... 524/556; 526/271; 526/318.2; 524/284

[58] Field of Search ................ 524/556, 284; 526/271, 526/318.2

[56] References Cited

U.S. PATENT DOCUMENTS 3,531,427 9/1970 Kervenski et al. ................ 260/29.6
5,118,498 6/1992 Helioff et al. ........................ 427/70

OTHER PUBLICATIONS

Ser. No. 07/761,089 at Board of Appeals.

*Primary Examiner*—Paul R. Michl
*Assistant Examiner*—John J. Guarriello
*Attorney, Agent, or Firm*—Walter Katz; Marilyn J. Maue; Joshua J. Ward

[57] ABSTRACT

What is provided herein is a colorless, stabilized aqueous solution of a $C_1$–$C_5$ alkyl vinyl ether and maleic acid copolymer which includes about 100 to 1,000 ppm of an additive mixture of (a) about 30–70% by weight of ethylenediaminetetraacetic acid (EDTA) or its salts, such as the disodium, trisodium, tetrasodium or disodium-calcium salts, and (b) about 30–70% by weight of a secondary additive which is an organic antioxidant and/or free radical scavenger selected from t-butylhydroquinone, propyl gallate, butylated hydroxy-anisole (BHA), butylated hydroxy-toluene (BHT), 4-hydroxymethyl-2,6-di-tert-butylphenol, 2,4,5-trihydroxybutyrophenone (THBP) and N,N-diethylhydroxylamine, said stabilized solution exhibiting a retention of at least about 85–90% of its original viscosity after 3 months. Preferably, the solution is prepared by hydrolyzing the corresponding anhydride in the presence of said additive mixture.

5 Claims, No Drawings

COLORLESS, NON-TOXIC, STABILIZED AQUEOUS SOLUTION OF A C1-C5 ALKYL VINYL ETHER AND MALEIC ACID COPOLYMERS

CROSS-REFERENCE TO RELATED APPLICATION

This is a continuation-in-part of application Ser. No. 761,089, filed Sep. 17, 1991 now abandoned.

BACKGROUND OF THE INVENTION

1. Field of the Invention

This invention relates to copolymers of $C_1$–$C_5$ alkyl vinyl ether and maleic acid, and, more particularly, to colorless, stabilized aqueous solutions of such copolymers.

2. Description of the Prior Art

The copolymerization of maleic anhydride and a $C_1$–$C_5$ alkyl vinyl ether yields a copolymer which is more properly characterized as an interpolymer wherein both ethylenically unsaturated moieties enter into the formation of the same polymer chain. It has been indicated by infra-red spectroscopy, nuclear magnetic resonance spectroscopy and other chemical analyses that alkyl vinyl ethers and maleic anhydride interpolymerize in the molar ratio of about 1:1, the polymer chain thereof containing alternating anhydride units and alkyl vinyl ether units. The resulting interpolymers are, in general, soluble in aqueous systems upon prolonged contact with water, due to the hydrolysis of the anhydride groups to acid groups, and are known to be useful in personal care products and other applications. In the aqueous environment, however, it has been found that the interpolymers undergo substantial and serious decomposition, which is manifested by a decrease in the viscosity of solutions prepared from the interpolymer materials. As it is often necessary to prepare specific interpolymers of specified viscosity grade, it is often found that, after suitable processing of the interpolymer the expected viscosity specifications of the solutions are not met. It has further been ascertained that elevated temperatures and even storage under ambient conditions cause rapid decline in the viscosity grade of the material. Since it is essential in commercial practice to obtain such interpolymers at definite specifications of viscosity, it has become necessary to effect a stabilization of the interpolymers whereby the viscosity of the material will remain substantially unchanged under conditions which normally lead to decomposition and consequent lowering of the viscosity.

In the art, various procedures have been attempted in order to obtain aqueous solutions of the interpolymers which will retain constant viscosities during extended periods of storage. These prior art methods, however, have not been entirely successful as in each instance the viscosity has been found to decrease over substantial periods of storage. These methods have generally involved the addition to the aqueous solutions of the interpolymer of various materials in an effort to effect the desired stabilization of the interpolymers. It has been suggested, for example, that certain thioamides may be employed to stabilize aqueous solutions of the interpolymer. However, these materials have been found useful only for short periods as the stabilizing characteristics become very poor over extended periods. Similarly, the use of ethylenediaminetetraacetic acid (EDTA) has been suggested as a stabilizing agent. As with the thioamides, however, this material has not accomplished the purpose.

Therefore, as pointed out, none of these prior materials have proven successful in providing aqueous solutions of interpolymers or copolymers of maleic acid or anhydride with alkyl vinyl ethers to enable use of the solutions for commercial specifications over periods of extended storage.

Kervenski, in U.S. Pat. No. 3,531,427, for example, described a stabilizer mixture of ethylenediaminetetraacetic acid and a secondary additive selected from the group consisting of thiourea, allylthiourea, ammonium thiocyanate, tannic acid, pyrrolidone, vinyl pyrrolidone, pyrogallol, dimethyl sulfoxide, polyvinyl pyrrolidone, sodium diethyldithiocarbamate, resorcinol, gallic acid, 2,2',4,4'-tetrahydroxybenzophenone, phloroglucinol, tartaric acid, citric acid, gluconic acid, and glycolic acid.

However, it has been discovered, that, for one or more of the following reasons, the stabilizer mixtures disclosed by Kervenski were not entirely satisfactory:

(1) many of the secondary additives listed were not effective in stabilizing the viscosity of the interpolymer;

(2) those secondary additives which were effective had to be used in very large amounts which precluded the use of the interpolymer in personal care and industrial applications;

(3) most of the secondary additives were very toxic even in low concentrations;

(4) several of the secondary additives were not sufficiently soluble in water to provide stabilized aqueous solutions of the copolymer; and (5) the secondary additives discolored the solution.

Accordingly, it is an object of this invention to provide colorless, stabilized aqueous solutions of a copolymer of a $C_1$–$C_5$ alkyl vinyl ether and maleic acid which is suitable for personal care and industrial applications, and which is effective for stabilizing the copolymer even when used at low concentrations.

Another object of the invention is to provide a process of preparing such colorless, stabilized aqueous solutions having higher viscosities than available previously and which will retain their initial viscosity levels over extended periods of time.

These and other objects and features of the invention will be made apparent as the description thereof proceeds.

SUMMARY OF THE INVENTION

What is provided herein is a colorless, stabilized aqueous solution of a $C_1$–$C_5$ alkyl vinyl ether and maleic acid copolymer which includes about 100 to 1,000 ppm of an additive mixture of (a) about 30–70% by weight of ethylenediaminetetraacetic acid, or its salts, such as the disodium, trisodium, tetrasodium or disodium-calcium salts, and (b) about 30–70% by weight of a secondary additive which is an organic antioxidant and/or free radical scavenger selected from t-butylhydroquinone, propyl gallate, N,N-diethylhydroxylamine, butylated hydroxy-anisole (BHA), butylated hydroxy-toluene (BHT), 4-hydroxymethyl-2,6-di-tert-butylphenol, and 2,4,5-trihydroxy-butyrophenone (THBP), said stabilized solution exhibiting a retention of at least about 85–90% of its original viscosity after 3 months. Preferably, the solution is prepared by hydrolyzing the corresponding anhydride in the presence of said additive mixture.

DETAILED DESCRIPTION OF THE INVENTION

According to this invention, copolymers of maleic anhydride and a $C_1$-$C_5$ alkyl vinyl ether are dissolved in water containing about 100–1,000 ppm of an additive mixture of (a) about 30–70% by weight of ethylenediaminetetraacetic acid and (b) about 30–70% by weight of a secondary additive which is an organic antioxidant and/or free radical scavenger selected from t-butylhydroquinone, propyl gallate, N,N-diethylhydroxylamine, butylated hydroxy-anisole (BHA), butylated hydroxytoluene (BHT), 4-hydroxymethyl-2,6-di-tertbutylphenol and 2,4,5-trihydroxy-butyrophenone (THBP). The polymer reaction solution containing the predetermined additive is then hydrolyzed to the corresponding acid form of the polymer to provide the desired colorless, stabilized aqueous solution of maleic acid-$C_1$-$C_5$ alkyl vinyl ether copolymer which includes the additive mixture.

While the additive mixture could be added after hydrolysis of the anhydride copolymer, it is much preferred to add it directly to the anhydride copolymer before hydrolysis. In this manner, an aqueous solution of the acid copolymer having relative viscosities of 11–14 are obtained, as measured at 1% in water at 25° C., are obtained for a typical high molecular weight maleic acid-$C_1$-$C_5$-alkyl vinyl ether copolymer in contrast to a viscosity value of 9 or below for untreated solutions, and 9–11 when the additive is included in the solution only after hydrolysis. The stabilizing mixture works effeciently even if processing of the polymer solution takes a very long time, as, e.g., it happens in the case of prolonged sparging with an inert gas in order to remove the residual solvent.

The secondary additive of the additive mixture of the invention has the following particular attributes:

(1) effective in stabilizing the viscosity of the interpolymer;

(2) useful in small amounts;

(3) soluble in water;

(4) does not discolor the solution;

(5) an effective antioxidant and/or free radical scavenger; and (6) t-butylhydroquinone, propyl gallate, butylated hydroxy-anisole (BHA), butylated hydroxytoluene (BHT), 4-hydroxymethyl-2,6-di-tert-butylphenol and 2,4,5-trihydroxy-butyrophenone (THBP) are suitable for use in denture additives, tooth pastes, mouth washes and other personal care products.

The invention will now be described with reference to the following examples.

COMPARATIVE EXAMPLES

1. Untreated Copolymer

A 1-liter resin kettle equipped with an agitator, a reflux condenser and a water bath was charged with 22.0 g. of methyl vinyl ether/maleic anhydride copolymer (Gantrez ® AN-169, International Specialty Products) of specific viscosity of 2.83 (as determined in methyl ethyl ketone at a concentration of 1% at 25° C.) and 178.0 g. of deionized water. While agitating, the mixture was heated to 85° C. and maintained at this temperature for 1.5 hours. During this period the anhydride groups of the copolymer were converted to carboxylic acid groups generating a methyl vinyl ether/maleic acid copolymer. The clear solution which contained 13.02% solids was cooled to room temperature and maintained, in the dark, for 3 months. The stability of the solution was determined by measuring its specific viscosity (1% in $H_2O$, at 25° C.) and Brookfield viscosity (Spindle #3, 5 rpm, 25° C.). The results were the following:

TABLE 1

| Time, months | Spec. Viscosity | Brookfield Viscosity, cps |
|---|---|---|
| 0 | 9.68 | 2160 |
| 3 | 5.84 | 600 |

The data shows that a solution of methyl vinyl ether/maleic acid copolymer, which did not contain any stabilizer, deteriorated to only 40% of its initial specific viscosity, and to about 28% of its initial Brookfield viscosity, after a period of only 3 months.

2. Individual Additives

To the solution prepared in Example 1, a number of different additives were added after dissolution of the polymer. The following data show the stabilizing effect of these additives:

TABLE 2

| Additive/ ppm | Time, months | Spec. Viscosity | Brookfield Viscosity, cps |
|---|---|---|---|
| None | 0 | 9.68 | 2160 |
| | 3 | 5.84 | 600 |
| Ethylene-diaminetetra-acetic acid (EDTA)/200 ppm | 0 | 9.68 | 2160 |
| | 3 | 8.65 | 2050 |
| t-Butyl hydro-quinone (TBHQ)/500 ppm | 0 | 9.68 | 2160 |
| | 3 | 8.90 | 1940 |
| N,N-Diethyl hydroxylamine (DEHA)/500 ppm | 0 | 9.68 | 2160 |
| | 3 | 8.78 | 2000 |
| Propyl gallate (PG)/500 | 0 | 9.68 | 2160 |
| | 3 | 8.70 | 1900 |

The data above shows that the addition of a stabilizing amount of either a transition metal chelating agent (EDTA), or of an antioxidant (TBHQ, PG), or a radical chaser (DEHA), substantially increased the stability of the acidic copolymer; and, particularly, it degraded to a significantly lesser degree than a nonstabilized copolymer solution of Example 1.

INVENTION EXAMPLES

1. Additive Mixture After Hydrolysis

To the solution of Example 1 various stabilizer blends were added. The stabilizing effect is apparent in the data in Table 3 below.

TABLE 3

| Additive Blend/ppm | Time, months | Spec. Viscosity | Brookfield Viscosity, cps |
|---|---|---|---|
| None | 0 | 9.68 | 2160 |
| | 3 | 5.84 | 600 |
| TBHQ/500 + EDTA/200 | 0 | 9.68 | 2160 |
| | 3 | 9.00 | 2100 |

The data shows an improvement over the individual components of Example 2. Specifically, the specific viscosity of the copolymer decreased by only 7.6% and the Brookfield viscosity of the copolymer solution was substantially unchanged after standing for 3 months at room temperature.

2. Additive Mixture Before Hydrolysis

A copolymer solution as in Example 1 was prepared by dissolving Gantrez® AN-169 in an additive blend of various stabilizers and water prior to beginning of heating. The acid copolymer was made by heating as in Example 1. The results are shown in Table 4 below.

TABLE 4

| Additive Blend/ppm | Time, months | Spec. Viscosity | Brookfield Viscosity, cps |
|---|---|---|---|
| TBHQ/75 + | 0 | 11.75 | 2800 |
| EDTA/75 | 3 | 10.87 | 2800 |
| DEHA/75 + | 0 | 11.23 | 2430 |
| EDTA/75 | 3 | 10.71 | 2400 |

The data above demonstrates the advantage of adding the stabilizers during dissolution of copolymer. Accordingly, both the specific viscosity and the Brookfield viscosity values of the solution were at least 90% of its initial values after 3 months, and with much higher initial and final viscosities with much lower concentrations of the stabilizer mixture, than the same additive mixture used after hydrolysis.

The data in Table 5 is for an additive mixture containing salts of EDTA showing the high efficiency of salts of EDTA used in conjunction with antioxidants added.

TABLE 5

| Additive Blend/ppm | Time, months | Spec. Viscosity | Brookfield Viscosity, cps |
|---|---|---|---|
| TBHQ/200 + | 0 | 14.09 | 7880 |
| EDTA-diNa-Ca/200 | 2.5 | 14.04 | 7780 |
| TBHQ/200 + | 0 | 11.26 | 2980 |
| EDTA-tetra Na/200 | 7 | 11.18 | 2800 |
| DEHA/200 + | 0 | 11.63 | 3060 |
| EDTA-di-Na/200 | 7 | 11.18 | 3060 |

While the invention has been described with particular reference to $C_1$–$C_5$ alkyl vinyl ether-maleic acid copolymers, it will be understood that related copolymers and terpolymers, and crosslinked products thereof, may be used as well.

What is claimed is:

1. A composition consisting essentially of a colorless, stabilized aqueous solution of (1) a copolymer of a $C_1$–$C_5$ alkyl vinyl ether and maleic acid and (2) about 100 to 1,000 ppm of an additive mixture of (a) about 30–70% by weight of ethylenediaminetetraacetic acid, and (b) about 30–70% by weight of a secondary additive which is an organic antioxidant and/or free radical scavenger selected from t-butylhydroquinone, propyl gallate, butylated hydroxy-anisole (BHA), butylated hydroxy-toluene (BHT), 4-hydroxymethyl-2,6-di-tert-butylphenol, 2,4,5-trihydroxy-butyrophenone (THBP) and N,N-diethylhydroxylamine, said stabilized solution exhibiting a retention of viscosity of at least 85–90% of its original viscosity after a standing period of 3 months.

2. A solution according to claim 1 wherein said solution is prepared by hydrolyzing a copolymer of a $C_1$–$C_5$ alkyl vinyl ether and maleic anhydride in the presence of said additive mixture.

3. A solution according to claim 2 which includes about 500 ppm of said additive mixture.

4. A solution according to claim 1 wherein said additive mixture includes about 50% by weight of (a) and (b).

5. A solution according to claim 1 wherein (a) is present as the disodium, trisodium, tetrasodium, or disodium-calcium salt.

* * * * *